Oct. 14, 1947.　　G. D. HULST, JR　　2,428,913
COUNT SELECTOR
Filed Dec. 10, 1943　　4 Sheets-Sheet 1
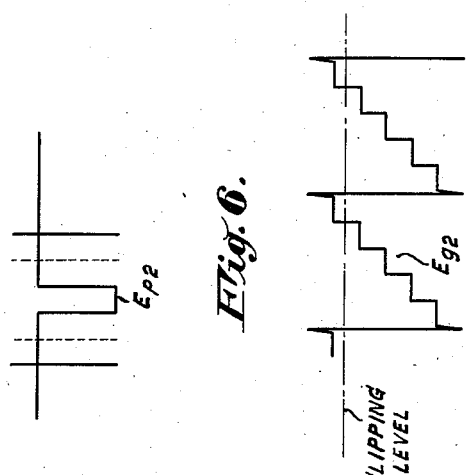
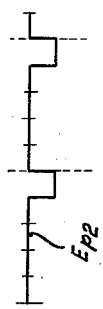
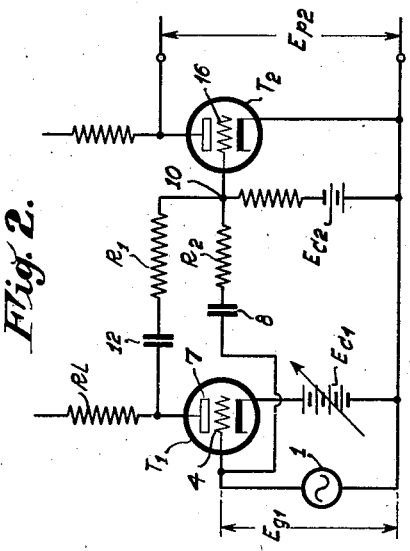
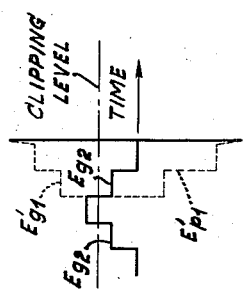
INVENTOR.
George D. Hulst, Jr.
BY
H. S. Grover
ATTORNEY.

Oct. 14, 1947.  G. D. HULST, JR  2,428,913
COUNT SELECTOR
Filed Dec. 10, 1943  4 Sheets-Sheet 2
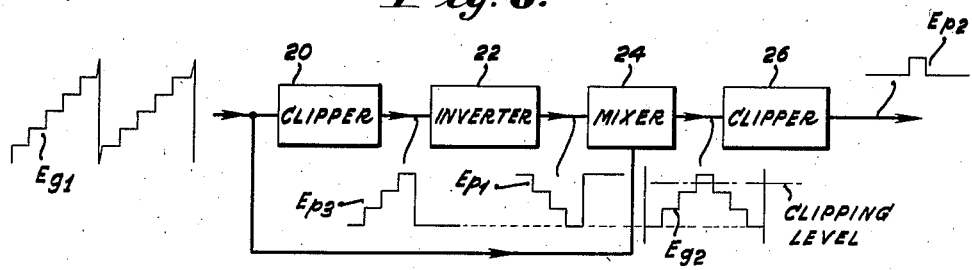
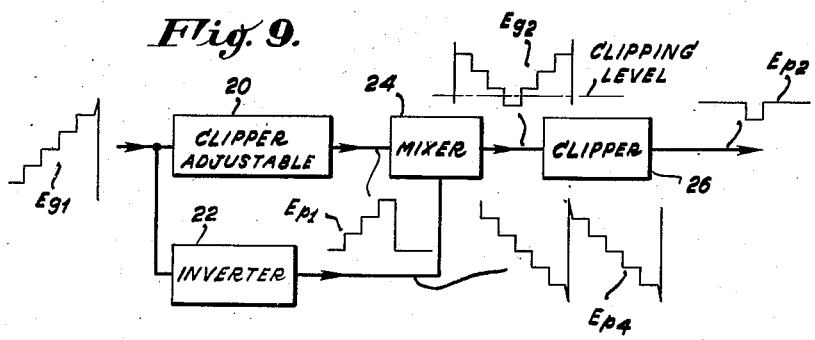
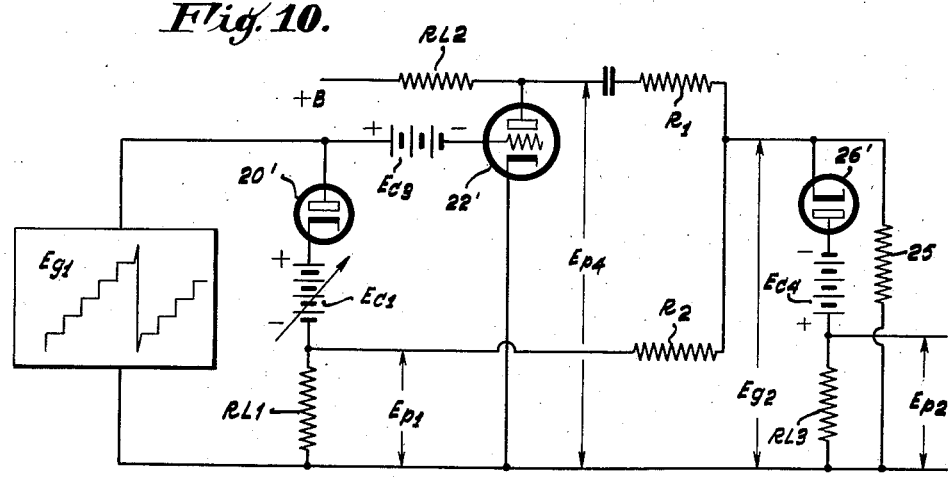
INVENTOR.
George D. Hulst, Jr.
BY
ATTORNEY.

Oct. 14, 1947.    G. D. HULST, JR    2,428,913
COUNT SELECTOR
Filed Dec. 10, 1943    4 Sheets-Sheet 3

INVENTOR.
George D. Hulst, Jr.
BY
H. S. Grover
ATTORNEY.

INVENTOR.
George D. Hulst, Jr.
BY
ATTORNEY.

Patented Oct. 14, 1947

2,428,913

UNITED STATES PATENT OFFICE 2,428,913

COUNT SELECTOR

George D. Hulst, Jr., Millburn, N. J., assignor to Radio Corporation of America, a corporation of Delaware Application December 10, 1943, Serial No. 513,803

14 Claims. (Cl. 250—27)

This application concerns a new and improved method and means for selecting from a series of counts such as produced in a counter type frequency divider of the type shown in E. L. C. White U. S. Patent #2,113,011, dated April 5, 1938, any one particular count. In my method and means a wave is produced on which an incident is caused to occur in time sequence with the selected count. The said selection may be for the purpose of investigation or observation of the count or pulse selected, or for the selection of the time interval at which the selected count occurs and hence for the detailed observation of some event which occurs concurrently with the said selected count. For instance, the pulse wave wherein the event occurs, that is, to be observed, may be applied to a cathode ray tube grid controlling the electron stream intensity to leave visible on the target only that portion of the trace to be observed and eliminate the remaining portion of the trace.

The selected count which is a fraction of the frequency of the first mentioned series of counts may also be used as a blanking voltage or sweep voltage or a voltage for triggering a circuit, etc., or for producing such a voltage. In addition, the wave wherein the incident occurs may be applied to the electron stream deflecting elements of a cathode ray tube to deflect the pattern on the target thereby permitting observation of the event or incident.

In a sense then my invention may be said to pertain to frequency dividers, since in my improved method and means I select any one of a chain of pulses or counts, and at the output of my improved method and means is provided a new wave wherein a feature thereof recurs at the rate at which the series or chains of pulses or counts recurs.

An object of my invention is a new and improved circuit for selecting for examination a pulse or count from a chain of pulses or counts which means is flexible in operation.

Another object of my invention is a new and improved circuit for selecting and making available for use in any manner a selected count or pulse occurring in a chain of counts or pulses, which chain of counts or pulses is recurring at a particular rate.

An additional object of my invention is a new and improved circuit for selecting from recurring series or chains of counts or pulses selected counts or pulses and generating from said selected counts or pulses a new wave having a feature or discontinuity which recurs at the rate of recurrence of the chains of counts.

Additional objects of my invention and the manner in which they are attained will appear from the detailed description of my method and means which follows. In this description reference will be made to the attached drawings wherein Fig. 1 shows graphically a chain of counts or pulses and represents graphically the voltage $Eg1$ applied to the grid of tube $T1$ of Fig. 2.

Fig. 2 is a wiring diagram of one modification of the invention.

Fig. 3 shows graphically the voltage $Ep1$ on the plate of tube $T1$ resulting from the selection of a particular count or pulse in the chain of counts or pulses $Eg1$. In the example given, the third pulse or count has been selected.

Fig. 4 shows graphically the voltage $Eg2$ obtained at point 10 in Fig. 2, this voltage being a combination of the effects of voltage $Ep1$ out of the tube $T1$ and the voltage $Eg1$ applied thereto. This figure also shows the clipping level of voltage $Eg2$.

Fig. 5 illustrates graphically the voltage $Ep2$ at the output of tube $T2$ when operated as specified.

Figs. 6 and 7 are graphs illustrating operation of the arrangement of Fig. 2 when the fifth count as represented by $Eg1$ is selected.

Figs. 8 to 15 are modifications of the arrangement of Fig. 2. In the modifications of Figs. 12, 13, 14 and 15 the counts are represented by voltages $E'g1$, which decrease by steps.

Figure 11:
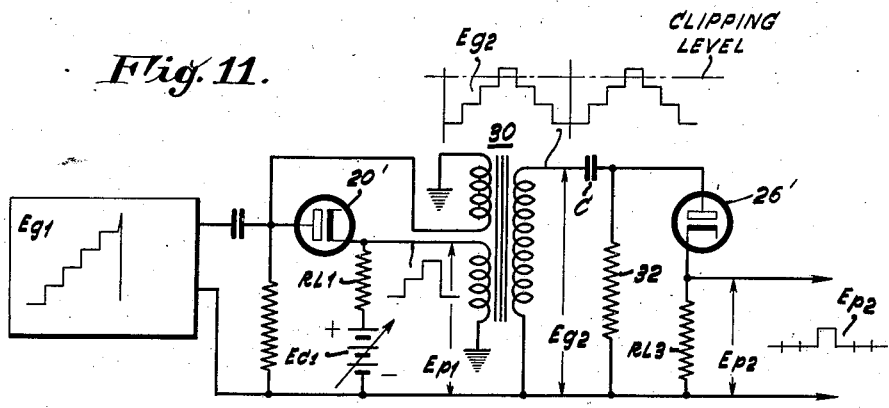

In my system a chain of pulses or counts represented by voltages $Eg1$ (Fig. 1) which increase progressively in amplitude are impressed from source 1 on the grid 4 of tube $T1$ of Fig. 2. The cathode of tube $T1$ is connected to a positive point on an adjustable bias source $Ec1$, the negative terminal of which is connected through the source 1 to the control grid 4, so that the bias $Ec1$ on the grid 4 with respect to the cathode may be adjusted from a point of substantially equal (ground) potential to a relatively high negative value. The control grid 4 is also coupled by a condenser 8 and resistance $R2$ to the control grid 16 of tube $T2$. The anode 7 of tube $T1$ is connected by condenser 12 and a second resistance $R1$ to the control grid 16. In the preferred form the source of bias $Ec2$ biases the grid of $T2$ to such a point that only the desired pulse will be transmitted to the output connections. The rest of the input wave being removed by the clipping action of tube $T2$. The anode and cathode of tube T2 has means for coupling thereto a utilization circuit.

In operation, it is assumed that the voltage $Eg1$, which increases in a series of steps as shown in Fig. 1, is applied to the grid 4 of tube T1. This voltage may be derived in any manner, for example, it may represent the output of a cycle counter wherein a voltage is built up in steps until a critical point is reached at which time the voltage drops to its original value and the cycle is repeated. The point at which the tube T1 is cut off depends upon the voltage $Ec1$ and the latter depends upon the adjustment of the source represented by $Ec1$.

At a selected point during the count the tube T1 begins to draw current whereupon this tube functions as an amplifier with a gain of somewhat less than the mu of the tube. The amplified voltage appearing across the tube load impedance, represented by RL, is of the form illustrated at $Ep1$ in Fig. 3, and depends upon the voltage $Eg1$ of Fig. 2. The condensers 8 and 12 are coupling condensers. The resistors R1 and R2 form a combining network and are of such magnitude that the signals from the grid and plate linearly mixed therein are mixed in equal proportions. The manner in which these voltages are mixed is illustrated in Figs. 3 and 4, where $Ep1$ represents the voltages at the plate of tube T1 and $Eg1$ represents the voltage on the grid of tube T1 and in the network. The voltages $Eg1$ and $Ep1$ are so proportioned in mixing that a desired resultant voltage $Eg2$ is provided on the grid of tube T2. As a consequence of this mixing of voltages I supply to the grid of tube T2 a voltage $Eg2$ which may be as illustrated in Fig. 4, where $E'g1$ is the desired portion of $Eg1$ and $E'p1$ is the desired portion of $Ep1$.

In the arrangement illustrated it is assumed that the cutoff bias of tube T1 is such that it is overcome by $Eg1$ at the start of the third from the last count in the chain of counts. The tube T1 then draws current through RL and the voltage on its anode falls off in decreasing steps as shown at $E'p1$ in Fig. 4 as the voltage $Eg1$ increases past cutoff through the remaining steps of the series of counts. Note that the successive steps by which the plate potential $E'p1$ decreases are considerably greater than the steps by which the voltage $E'g1$ increases. The amount of difference depends upon the gain of tube T1 and the values of the elements of the mixing network.

As stated above, the voltage $Eg2$ may be utilized in any manner such as upon an indicator for counting purposes or supplied to a utilization circuit. When used for indicating purposes note that the sensitivity and accuracy of the indication is enhanced due to the fact that the original counts of each chain the number of counts of which is known is represented by a single count.

In a particular use the voltage is supplied to a tube T2 the grid of which is biased negative to such a value that the maximums of voltage $Eg2$ only overcomes the tube cutoff. This tube may be considered a clipping tube and may be biased to operate at the clipping level as shown in Fig. 4. This tube then has an output as illustrated in Fig. 5 of the drawings.

By selecting a different count in the chain of counts $Eg1$, say for example the fifth count, a voltage $Ep1$ of constant amplitude is derived. Then $Eg1$ is mixed in the network with a constant plate voltage $Ep1$ to produce a voltage $Eg2$ as shown in Fig. 6, similar in appearance to $Eg1$. The voltage $Ep2$ is then as shown in Fig. 7 when the clipping level is as shown in Fig. 6. The count selection is by adjustment of source $Ec1$.

Note that the chain of counts or pulses represented at $Eg1$ has now been divided to provide a single pulse for each group of pulses. Moreover, it is noted that by adjustment of $Ec1$ any desired count or pulse of the chain $Eg1$ can be caused to overcome the cutoff bias on tube T1 and start this tube to amplifying to supply an output $Ep1$ which when mixed with $Eg1$ provides a voltage at $Eg2$ which is maximum at an earlier or later point in the cycle of operation so that the pulses at the output of tube T2 as illustrated in Fig. 5 may be moved along the horizontal axis as desired. That is, these pulses may be made to recur in point of time in synchronism with any one of the counts represented by $Eg1$.

An essential feature of my method and means is means for clipping a voltage of the nature of $Eg1$ at a selected point, means which may be included with the first means for inverting the clipped voltage, a means for mixing the inverted voltage with the original step voltage and a further means for clipping the resulting voltage. In Fig. 2 the tube T1 serves the first clipping action and the inverting action, the network mixes the voltages and the tube T2 functions as the second clipper. The various components for performing these functions may be arranged in various manners and the sequence of the operations between the first and final clipping action may be altered without altering the principle of operation. The arrangement of Fig. 2 may be considered in general terms as being composed of the above elements arranged as in Fig. 8. In Fig. 8 then there is a first clipper to select the desired count as is done by the biased tube T1 of Fig. 2. This clipper may however, be a biased diode and then its output will not be reversed as in Fig. 1 but will be as shown by the graph between 20 and 22 designated $Ep3$. The inverter 22 serves the purpose of the tube T1 action by virtue of the reversing effect in its plate circuit as derived by using the potential drop across RL. The output of this inverter is shown by the graph $Ep1$ to the right and below 22. The mixer 24 is a network R1 and R2, Fig. 2, or other means for bringing the voltage $Eg1$ and $Ep1$ together to derive the voltage $Eg2$. The voltage clipping means in 26 may be a tube such as tube T2 of Fig. 2 or a biased diode. In Fig. 2 the tube T2 not only clips the voltage but inverts the same, as shown by the voltage graph $Ep2$. In Fig. 8 a biased diode or similar clipping means is used which does not have the inverting action and the output is then as shown above and to the right of 26.

The phase inverter in 22 may then be an electron discharge tube operating class A with its input coupled to the diode and its output coupled to one branch of the mixer network, the other branch thereof being excited by the original step voltage $Eg1$.

In the embodiment of Fig. 9, $Eg1$ is fed to an adjustable clipper 20 and to an inverter 22, and thence to a mixer 24 and from the mixer to the second clipper 26. Note that the inverter output $Ep4$ is a series of downward steps being $Eg1$ inverted and as a result the mixer output $Eg2$ is of the form shown. Now the second clipper is of such polarity that the bottom step is segregated from its fellow steps by the clipping action. A detailed circuit arrangement of the modification shown in Fig. 9 is found in Fig. 10.

In Fig. 10 the clipper for selecting the desired count as represented by $Eg1$ is the diode tube $20'$ having its cathode coupled to source $Eg1$ by adjustable bias source $Ec1$ and a diode load resistance $RL1$. The voltage $Ep1$ which builds up across $RL1$ is clipped with respect to the voltage $Eg1$ by virtue of the diode operation. The diode bias is adjusted, by applying positive potential to the diode cathode, so that $Eg1$ has to build up to the desired selected count before current flows. In the absence of current flow little or no voltage is developed across $RL1$ but when current flows the potential drop across $RL1$ builds up in steps after the critical voltage $Eg1$ is reached so that $RL1$ feeds to the mixing network $R1R2$ a voltage as indicated at $Ep1$ in Fig. 9. The voltage $Ep1$ is in phase with the voltage $Eg1$.

The voltage $Eg1$ is also supplied through bias source $Ec3$ to the control grid of an amplifier and inverter tube $22'$ operating class A so that a voltage $Ep4$ is developed across its anode load resistance $RL2$ which decreases in steps, being similar to the voltage $Eg1$ when properly inverted. This voltage and $Ep1$ are supplied to the mixing network $R1R2$ and proportioined therein to feed a resulting voltage $Eg2$ to the diode clipper $26'$. The clipper tube $26'$ has its anode coupled to the negative end of a bias source $Ec4$, the positive side of which is connected by the load resistance $RL3$ and resistance $25$ to the diode cathode. This inverts the voltage $Ep2$ because tube $26'$ does not pass current through the resistance $RL3$ until $Eg2$ becomes sufficiently negative to drop the cathode potential enough to overcome the positive potential placed on the cathode by the source $Ec4$. The clipping level may be shown on $Eg2$ in Fig. 9, and the output across $RL3$ may be represented by $Ep2$ in Fig. 9.

The phase inverter need not be a triode tube operating class A but may be any appropriate means which inverts the voltage as desired. For example, a voltage transformer may be used as in Fig. 11.

In the modification of Fig. 11, the voltage $Eg1$ is applied to a biased diode $20'$ wherein the clipping action takes place. The source $Ec1$ is set so that the tube blocks off all voltages of less strength than say the third count. The third count overcomes the bias and current flows in $20'$ to produce in $RL1$ a potential drop $Ep1$ of the character shown under the diode connection to one of the primary windings of a transformer $30$ having a second primary winding excited directly by $Eg1$. This is the mixing as well as the phase reversing circuit. The two primary windings are so poled that he drop across $RL1$, i. e., $Ep1$ is combined with $Eg1$ in the desired manner and in the desired proportion in the transformer field to produce in the secondary winding of the transformer $30$ a voltage $Eg2$, as shown above the connection between the secondary winding and the diode $26'$ wherein the clipping action takes place. Diode $26'$ is biased by diode load resistance $RL3$ and bias resistance $32$ to clip the voltage $Eg2$ as indicated to supply an output across $RL3$ of the wave form shown. The condenser $C$ and resistance are sufficiently high to maintain the instantaneous voltage of the most positive portion of $Eg2$ at or near the plate to cathode voltage of $T2$ at which current commences to flow, that is to say, approximately zero bias. It is to be noted that the modification of Fig. 11 is similar in principle to the arrangement of Fig. 2. Although the voltage across $RL1$ is not reversed or inverted as in Fig. 2, the voltage $Eg2$ is similar to the same voltage in Fig. 2. The inverting or reversing action takes place in the windings and/or transformer $30$ field. The final output $Ep2$ is as shown in Fig. 11.

Figure 12:
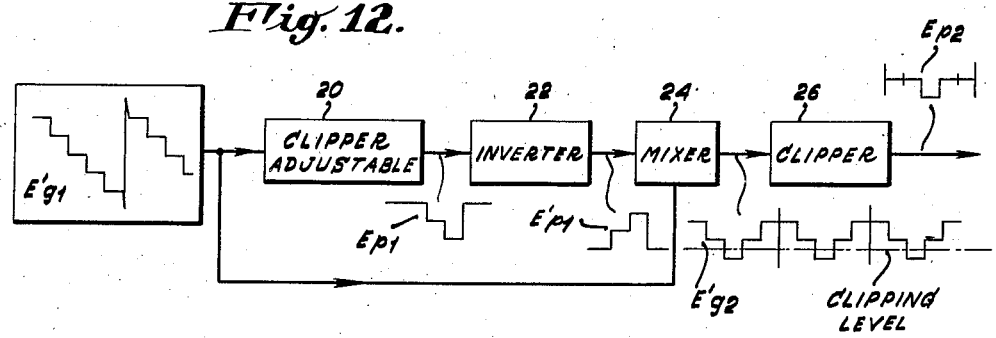

My count selecting method and means is also useful to select any one of a chain of counts which may be represented by steps of voltage of decreasing value such as shown at $E'g1$ in Fig. 12. Counts as represented by $E'g1$ in Fig. 12 may be obtained by a counter circuit in general as described hereinbefore but operated to produce an output potential that decreases in steps with the groups of steps recurring. The voltage $E'g1$ may also be obtained by applying the voltage $Eg1$, say of Fig. 1, to an inverter such as a linear amplifier or a transformer properly arranged in a circuit to provide a voltage that decreases in steps. No claim is made herein to means for producing the voltage $E'g1$.

Figure 13:
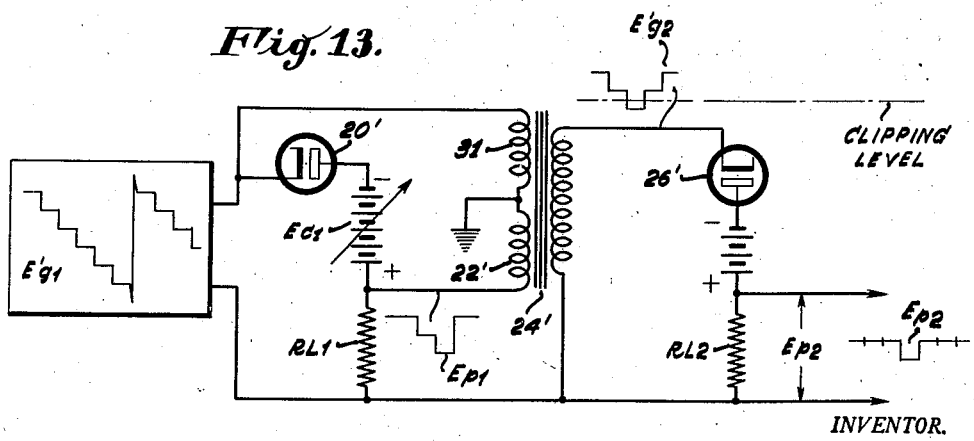

The principle of operation here is as in the prior modification. The operation is obvious by inspection of Fig. 12 and Fig. 13 wherein is shown the essential features of an embodiment illustrated by rectangles in Fig. 12. The voltage $E'g1$ is applied to a clipper $20$, Fig. 12, which is adjustable, and also to the mixer $24$, which may be a transformer $24'$, Fig. 13. The clipper in $20$ may include a diode $20'$ with the anode held negative the desired amount by source $Ec1$ in series with load resistance $RL1$. When the counts step down to the selected count the bias is such that the cathode of the tube becomes sufficiently negative relative to the anode so that current flows in $RL1$ to produce thereacross the clipped output $Ep1$ which is fed to one of the windings $22'$ of transformer $24'$. The voltage $E'g1$ is fed to the other winding $31$. The winding $22'$ is so poled as to invert the voltage $Ep1$, Figs. 12 and 13, to provide in effect in the transformer windings and field a voltage $E'p1$, Fig. 12. This voltage is mixed with $E'g1$ in the transformer $30$ and the voltages so proportioned as to provide in the secondary winding a voltage $E'g2$, as shown. This voltage is clipped by diode clipper $26'$ to provide across $RL2$ an output $Ep2$ as shown.

Figure 14:
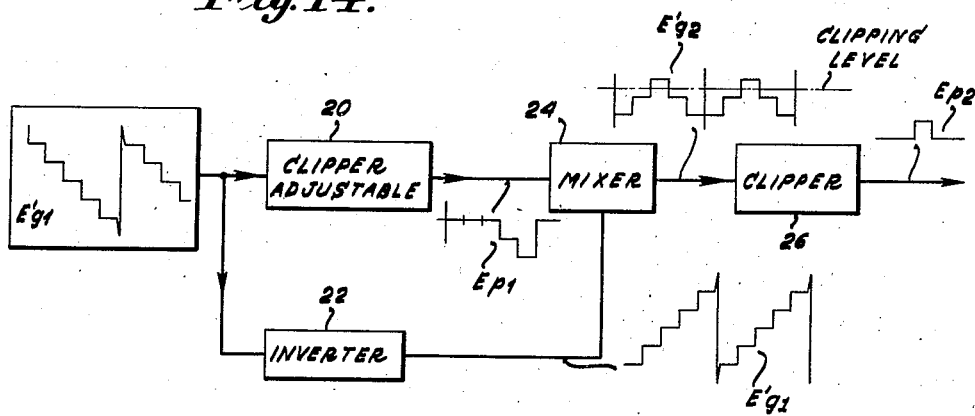
Figure 15:
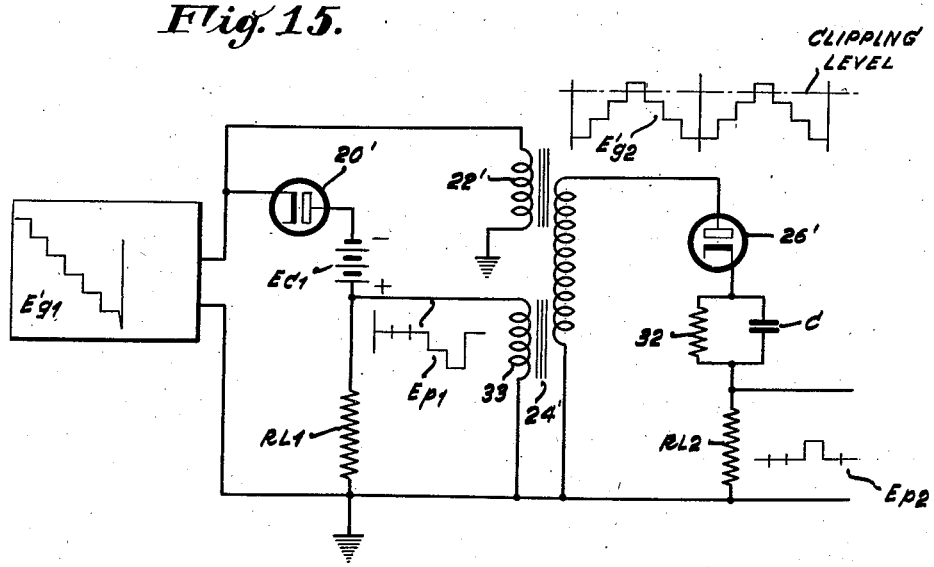

The inverter may be in the path of the voltage $E'g1$ between the source of $E'g1$ and the mixer. Such an embodiment is shown in Figs. 14 and 15. The diode clipper $20'$, Fig. 15, operates as described above in connection with Fig. 13 to provide across $RL1$ a clipped voltage $Ep1$. The winding $22'$ is excited by $E'g1$ and is so poled as to reverse the voltage $E'g1$ relative to the voltage $Ep1$ on the other primary winding $33$ of transformer $24'$. The reversed voltage $E'g1$ and $Ep1$ are so proportioned that they add or combine to provide in the secondary winding of transformer $24'$ a voltage $E'g2$ which is clipped at the level indicated and overcomes the bias on the anode of diode $26'$ (due to resistance $32$ and load resistance $RL2$) to produce in load resistance $RL2$ a voltage represented at $Ep2$. The resistance $32$ and condenser $C$ must have a product $RC$ sufficiently high that a charge on condenser $C$ caused by current passing through $26$ is maintained to a sufficient degree throughout duration of entire cycle that it acts as a source of bias for the desired clipping action.

2,428,913

I claim:

1. In apparatus for selecting any count from a series or chain of counts represented by voltages which change in value from an initial value by steps to a second value, return to the said initial value and repeat the cycle, a voltage mixer wherein two voltages each of which change in value by steps are linearly mixed in the desired proportions, a voltage clipper in a first path having an input excited by said first named voltage and an output coupled to said mixer stage, a second path having an input excited by said first voltage and an output coupled to said mixer stage, a voltage inverter in one of said paths, and an output circuit for said mixer stage.

2. In apparatus for selecting any count from a series or chain of counts represented by voltages which change in value from an initial value by steps to a second value, return to the said initial value and repeat the cycle, a voltage mixer wherein two voltages each of which change in value by steps are linearly mixed in the desired proportions, a voltage clipper in a first path having an input excited by said first named voltage and an output coupled to said mixer stage, a second path having an input excited by said first voltage and an output coupled to said mixer stage, a voltage inverter in said first path, and an output circuit for said mixer stage.

3. In apparatus for selecting any count from a series or chain of counts represented by voltages which change in value from an initial value by steps to a second value, return to the said initial value and repeat the cycle, a mixing stage wherein two voltages each of which change in value by steps are linearly mixed in the desired proportions, a voltage clipper in a first path having an input excited by said first named voltage and an output coupled to said mixer stage, a second path having an input excited by said first voltage and an output coupled to said mixer stage, a voltage inverter in said second path, and an output circuit for said mixer stage.

4. In apparatus for selecting any count from a series or chain of counts represented by voltages which change in value from an initial value by steps to a second value, return to the said initial value and repeat the cycle, a mixing stage wherein two voltages each of which change in value by steps are linearly mixed in the desired proportions, a voltage clipper in a first path having an input excited by said first named voltage and an output coupled to said mixer stage, a second path having an input excited by said first voltage and an output coupled to said mixer stage, a voltage inverter in one of said paths, an output circuit for said mixer stage, and a voltage clipper coupled to the output of said mixer stage.

5. In apparatus for selecting any count from a series or chain of counts represented by voltages which change in value from an initial value by steps to a second value, return to the said initial value and repeat the cycle, a mixing network comprising voltage proportioning resistances wherein two voltages each of which change in value by steps are linearly mixed in the desired proportions, a voltage clipper tube excited by said first voltage and having output electrodes coupled to said mixer stage, a second path having an input excited by said first voltage and an output coupled to said mixer stage, a voltage inverter in one of said couplings, and a second clipper tube coupled to said mixer stage.

6. In apparatus for selecting any count from a series or chain of counts which may be represented by a potential which progresses in steps corresponding to said counts from a first value to a second value, returns to said first value and repeats, a discharge tube voltage clipper and voltage reverser having electrodes excited by said potential and included in circuit with a load impedance, means for adjustably biasing the cutoff bias of said tube to a value whereat it is overcome by a potential corresponding to a selected count of said chain of counts, a path having an input excited by said first potential and having an output, a mixing network coupled to said impedance and to the output of said path, the mixed network serving to mix the potentials developed across said impedance with said first potentials to produce in the network a combined potential having a peak value at a time corresponding to the time at which said potential corresponding to said selected count recurs and a tube potential clipper coupled to said mixer network.

7. In apparatus for selecting any count from a series or chain of counts which may be represented by a potential which progresses in steps corresponding to said counts from a first value to a second value, returns to said first value and repeats, a discharge tube voltage clipper having electrodes excited by said potential and included in circuit with a load impedance, means for adjustably biasing the cutoff bias of said tube to a value whereat it is overcome by a potential corresponding to a selected count of said chain of counts, a path having an input excited by said first potential and having an output, a potential reverser tube having an input coupled to said path output, said last tube having an output, a combining network coupled to said impedance and to the output of said potential reverser, the mixer network serving to mix the potentials developed across said impedance with said first potentials to produce in the network a combined potential having a maximum value at a time corresponding to the time at which said potential corresponding to said selected count recurs and a tube potential clipper coupled to said mixer network.

8. In apparatus for selecting any count from a series or chain of counts which may be represented by a potential which progresses in steps corresponding to said counts from a first value to a second value, returns to said first value and repeats, a discharge tube voltage clipper having electrodes excited by said potential and included in circuit with a load impedance, means for adjustably biasing the cutoff bias of said tube to a value whereat it is overcome by a potential corresponding to a selected count of said chain of counts, a transformer having a secondary winding and having a first primary winding excited by said first potential and a second winding coupled to said impedance, the polarity of the said windings being such that there is a relative potential polarity reversal in the transformer to mix the potentials developed across said impedance with said first potentials to produce in the secondary winding a resultant potential having a maximum value at a time corresponding to the time at which said potential corresponding to said selected count recurs and a tube potential clipper coupled to said secondary winding.

9. In a system of the class described, a source of voltages which increases in steps from a minimum value to a maximum value and then repeats, a clipper tube excited by said voltages and in a circuit including a load impedance and a bias circuit for adjusting the cutoff bias of said device, a voltage combining circuit coupled with the said impedance and with said source, a voltage reverser in one of said couplings, a second clipper tube having electrodes coupled to said combining circuit for deriving a wave an incident on which recurs in time sequence with recurrence of the selected voltage at which the bias of said first device is overcome.

10. In a system of the class described, a source of voltages which increases in steps from a maximum value to a minimum value and then repeats, a clipper tube excited by said voltage and having electrodes in circuit with an output impedance and with an adjustable source of bias for adjusting the cutoff bias of said tube, a voltage combining circuit coupled with said impedance and with said source, a voltage inverter in one of said couplings, a voltage clipper tube coupled to said combining circuit and biased to derive a wave an incident on which recurs in time sequence with recurrence of the selected voltage at which the bias of said first device is overcome.

11. In apparatus of the class described an electron discharge device having a control electrode, a cathode and an output electrode, an adjustable bias connecting said cathode to said control electrode for applying to said control grid an adjustable cutoff bias, connections for applying to said control electrode potential which increases in recurring steps, from a minimum value to a maximum value, a potential combining network, a coupling between said potential combining network and the output electrode of said device and connections for applying said potential which increases in recurring steps to said network whereby a resultant voltage which is a summation of the voltage applied to the control electrode of said tube and the voltage amplified in said tube is obtained in said network.

12. In apparatus for selecting any count from a series or chain of counts, means for producing a potential which progresses in steps corresponding to said counts from a minimum value to a maximum value, a discharge tube having input and output electrodes, means for adjustably varying the cutoff bias of said tube to a value whereat it is overcome by a potential corresponding to a selected count of said chain of counts, connections for applying said potential to said input electrodes, a combining network and connections for impressing amplified potentials from the output electrodes of said tube and potentials from said first connections on said network to produce therein a combined potential having a maximum value at a time corresponding to the time at which said potential corresponding to said selected count recurs.

13. In apparatus of the class described an electron discharge device having a control electrode, a cathode and an anode, an adjustable bias connecting said cathode to said control electrode for applying thereto an adjustable cutoff bias, connections for applying to said control electrode potential which increases in recurring steps, from a minimum value to a maximum value, a potential combining network, a coupling between said potential combining network and the anode and cathode of said device and connections for applying said potential which increases in steps to said network whereby a resultant potential which is a summation of the voltage applied to the control electrode of said device and the voltage amplified in said device is obtained.

14. In apparatus for selecting any count from a series or chain of counts, means for producing a potential which progresses in steps corresponding to said counts from a minimum value to a maximum value, a discharge tube having input and output electrodes, means for adjustably varying the cutoff bias of said tube to a value whereat it is overcome by a potential corresponding to a selected count of said chain of counts, connections for applying said potential to said input electrodes, a combining network and connections for impressing potential from the output electrodes of said tube and from said first connections on said network, and a second tube having input electrodes coupled to said network and output electrodes coupled to an output circuit.

GEORGE D. HULST, Jr.

REFERENCES CITED

The following references are of record in the file of this patent:

UNITED STATES PATENTS

| Number | Name | Date |
|---|---|---|
| 2,266,401 | Reeves | Dec. 16, 1941 |
| 1,927,676 | Bedford | Sept. 19, 1933 |
| 2,217,957 | Lewis | Oct. 15, 1940 |
| 2,266,154 | Blumlein | Dec. 16, 1941 |
| 2,113,011 | White | Sept. 19, 1933 |